INVENTOR.
NIELS O. YOUNG

United States Patent Office 3,470,329
Patented Sept. 30, 1969

3,470,329
INTERFEROMETER MICROPHONE
Niels O. Young, Lincoln, Mass., assignor to Block
 Engineering, Inc., Cambridge, Mass., a corporation of Delaware
Filed Feb. 9, 1966, Ser. No. 526,241
Int. Cl. H04r 17/02, 19/04, 21/02
U.S. Cl. 179—121    6 Claims

ABSTRACT OF THE DISCLOSURE

An optical microphone having a light source and an interferometer for producing circular interference patterns from the light of the source in response to sound. The interferometer is adjusted to operate on the central fringe of the pattern so that changes in the sound field vary the intensity of the central pattern. The geometry of the device provides optimum light throughput.

---

This invention relates to electroacoustic optical devices and more particularly to an interferometric microphone.

Microphones of high sensitivity capable of measuring basis thermal noise of their environment are available for frequencies below about 10 kc. At higher frequencies, present devices such as capacitive microphones cannot respond to the basic noise primarily because the displacements to be sensed are so small, e.g. 1 A. or less.

Precise sound measurements of low amplitude, high frequency sound are desirable in a number of situations such as in a refinement of the known technique of determining architectural acoustics by sound pressures emitted by a spark, the study of natural sound sources such as signals from bats, or the like.

A principal object of the present invention is, therefore, to provide means and method determining extremely low amplitudes of acoustic energy at frequencies well above 10 kc.

Yet another object of the present invention is to provide a microphone which generally comprises a light source, an optical interferometer having an element movable responsively to sonic energy for modulating the light provided by the source in accordance with the frequency of the sonic energy, and means for detecting the modulated light and for translating the modulation into an electrical signal.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference shoold be had to the following detailed description taken in connection with the accompanying drawings wherein.

Generally the present invention involves the translation of sonic vibrations into an interferometric modulation of light and the subsequent translation of the modulated light into corresponding electrical signals.

Light transmitted through an optical interferometer is divided into two beams which when recombined interfere with one another and provide various light intensities depending upon the difference in path length. This creates the well-known interference fringe pattern typical of the optical output of interferometers. An optical interferometer thus comprises means for splitting a light from a single source into two beams, means for providing a first optical path for one beam, means for providing a second optical path, which may be of different length, for the second beam, and means for recombining the two beams. If one of these means are moved and alter path lengths, the interference fringe pattern will change. This phenomenon forms the basis for devices such as interference spectrometers wherein the motion of an element periodically varies the path length of interfering beams with respect to one another, thereby modulating the light from the source.

Figure 1:
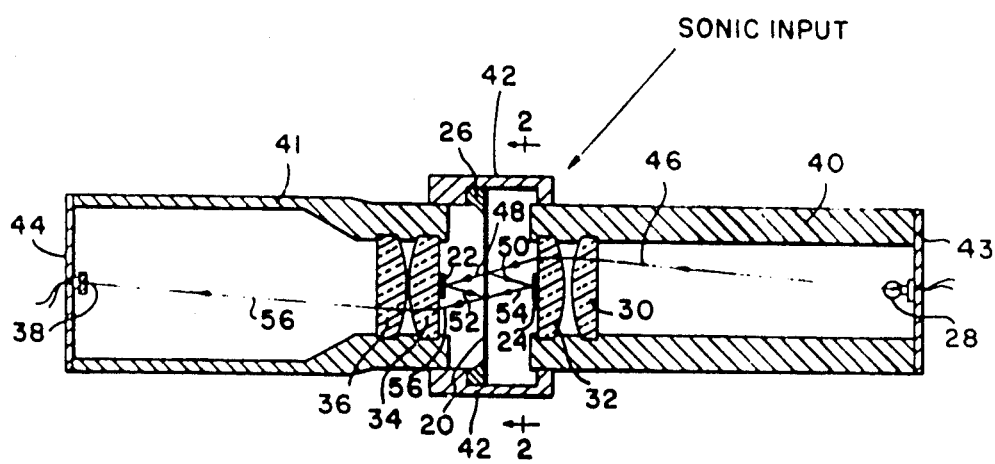
FIG. 1 is a cross section through a schematic diagram of an instrument embodying the principles of the present invention.

Referring now to the drawing, there is shown in FIG. 1 a typical microphone embodying the principles of the present invention and including an optical interferometer. As means for splitting a light beam into two separate beams there is provided a beam splitter or plane pellicle 20. Means are also provided for defining the two light paths and, in the form shown, comprises two plane reflectors or mirrors 22 and 24. The interferometer is constructed such that the reflective surfaces of mirrors 22 and 24 are spaced from one another in a parallel facing relationship. Pellicle 20, which is semi-reflective and semi-transmissive, is mounted on support means 26 so that its plane is parallel to and almost equi-distant between the reflective surfaces of mirrors 22 and 24. Typically the pellicle is circular and, therefore, support means 26 is in the form of a ring with a sharpened inner edge to minimize asperities in flatness of the pellicle edges adjacent the line of contact with the ring. The pellicle, in one form, is a very thin cellulose ester film prepared by spreading an organic ester solution on the still surface of a body of water and selecting an area of proper thickness. It can be mounted in a flat manner across the ring either by self-adhesion or by any of a number of known techniques.

To provide light to the interferometer, the device includes light source 28, typically a concentrated filament lamp of the variety used as a microscope illuminator. A first optical system, shown as lenses 30 and 32, is positioned in the path of light from source 28, for imaging the latter in part through the pellicle and onto mirror 22, and in part by reflection from the pellicle and onto the mirror 24. A second optical system comprising lenses 34 and 36 is positioned for imaging light from the mirrors and pellicle (i.e. both transmitted by and reflected from the latter) onto radiation detector 38.

Means are provided for supporting the various elements thus described in their defined relationship, and to this end, the device includes a pair of hollow cylindrical, light-opaque containers or tubes 40 and 41. The tubes are rigidly held coaxially with adjacent ends in spaced-apart relation by a number of longitudinal braces 42. Lenses 30 and 32 are disposed in the end of tube 40 adjacent tube 41, whilst lenses 34 and 36 are mounted in the end of tube 41 adjacent tube 40. The far end of tube 40 is covered with cap 43 which supports light source 28. Similarly, the far end of tube 41 is covered with cap 44 which supports detector 38. Ring 26 is supported about its periphery by connection to braces 42.

In the preferred embodiment, lens 32 is plano-convex and the plane surface thereof conveniently provides the support for mirror 24. The latter is positioned about the optical axis of lens 32 and, of course, is considerably lesser in diameter so as to occlude but a small portion of the total lens aperture. Similarly, lens 34 is plano-convex and mirror 22 is, similarly to mirror 24, dimensioned and centrally mounted on the plane surface of lens 34.

Tubes 40 and 41 and braces 42 are dimensioned longitudinally so that mirror 22 and light source 28 are at the conjugate foci of the lens system of lenses 30 and 32. In like manner, mirror 24 and detector 38 are at the conjugate foci of the lens system formed by lenses 34 and 6. It will also be seen that the space in which pellicle 20 is disposed is open to the ambient atmosphere by virtue of the open lattice structure provided by braces 42.

The pellicle preferably has very low inertia and in a typical embodiment is about 2000 A. thick and has a free diameter of about 3 mm. the annular sensitive zone being about 2 mm. in diameter. Mirrors 22 and 24 are each about 1 mm. in diameter and conveniently are formed by vacuum evaporation, for example of aluminum, onto the central portion of the plane sides of relay lenses 32 and 34. Detector 38 can be a number of devices and typically is a silicon back-biased diode (such as is available from Edgarton, Germeshousen & Grier, Boston, Mass.).

To describe the operation of the device, it can be assumed that light source 28 is excited and that radiation detector 38 is suitably connected to known means (not shown) for recording or displaying either aurally or visually, the electrical output from the detector. Assuming further that pellicle 20 is completely stationary, it will be apparent that light from source 28, shown as exemplary ray 46 is focused through pellicle 20, as ray 48 onto mirror 22. Because the pellicle is partially reflective and is positioned almost exactly between the mirrors, some of the focused light (shown as ray 50) reflects from the pellicle and is imaged onto mirror 24. Rays 48 and 50 are reflected by mirrors 22 and 24 respectively (as rays 52 and 54) back to a substantially common point on pellicle 20, and recombined as ray 56, are transmitted through lenses 34 and 36 to be focused onto detector 38.

Rays 52 and 54 will constructively or destructively interfere with one another depending on whether or not they are in or out of phase with one another. Thus, the light from source 28 will be formed into a series or pattern of concentric, circular, interference fringes imaged toward detector 38, the fringe of maximum mean radius (or first order fringe) occurring at the center of the pattern. Detector 38 is dimensioned and positioned such that it subtends preferably only the central fringe.

If the pellicle is translated at constant velocity normally to its plane, thus causing a change in retardation, the interference phenomenon sensed by the detector will vary in intensity periodically as the light rays (of mean wavelength $\lambda$) switch between constructive and destructive interference for each $\frac{1}{4}\lambda$ traveled by the pellicle, because the change in path length is twice the travel of the pellicle. The detector output will be a function of this intensity variation expressed as an electrical signal. The light from source 28 can be either polychromatic or monochromatic. In either case, the motion by the pellicle serves to impose a modulation on the, the frequency of modulation (for a fixed pellicle velocity) being proportional to the reciprocal wavelength of the light and the amplitude being proportional to the intensity at that light wavelength.

Where the light from source 28 is white, it contains, of course, a multiplicity of wavelengths. The sum of the contributions from the distribution of light wavelengths is shown ideally in FIG. 3 as an interferogram in which intensity is plotted against retardation or pellicle displacement.

It will be appreciated that, because the pellicle is of very low inertia and is exposed through the open framework of the braces to the ambient atmosphere, the pellicle will be acoustically coupled to a sonic input, and the latter will provide the desired translatory force on the pellicle. In the preferred form, it is preferred to limit the pellicle travel to not more than $\frac{1}{4}$ of the average wavelength (e.g. about 6000 A.) of the light from source 28. This can be accomplished by simply attenuating the sonic input (shown by an appropriately identified arrow in FIG. 1) if necessary to the desired maximum.

Figure 3:
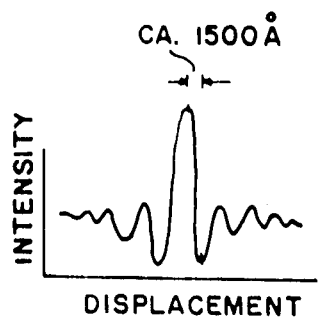
FIG. 3 is a graphical representation of an interferogrammatic signal at the radiation detector of the device of FIG. 1.
Figure 2:
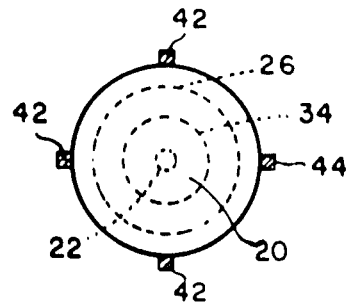
FIG. 2 is a cross section taken along the line 2—2 of FIG. 1.

Thus, pellicle 20 can be positioned such that, for a $\frac{1}{4}\lambda$ travel thereof, the fringe intensity at detector 28 can vary only between a maximum and a minimum, i.e. as shown in FIG. 3 between the maximum and minimum of the largest white light fringe. The interferometer is adjusted so that the pellicle, at rest, is positioned to give a transmission midway between the maximum and minimum intensity of this fringe. Usually one can expect this maximum fringe to be at or near the center of an interferogram, i.e. the position of the pellicle where the fringes of all light wavelengths (at least for a small range of wavelengths) have the same phase. For white light (of average $\lambda$ of 6000 A.) motion of the pellicle through about 1500 A. will result in the desired maximum light intensity variations, as shown in FIG. 3.

Now, as a sonic wave of given sonic frequency content strikes pellicle 20, with force sufficient to translate the pellicle along the optical axis of the lens systems not more than a maximum of $\frac{1}{4}\lambda$, the pellicle will vibrate responsively to the sound frequency, correspondingly changing the amplitude of light incident on detector 28. The electrical output signal from the latter will in turn correspond to the light input. The sonic modulation appears as a small periodic (AC) component superimposed on a relatively large static (DC) component due to the standing light flux.

For a pellicle of the type as dimensioned and described, the resonant frequency appears to be about 2 kc., and this is the lower cut-off in the response to sound. On the other hand, the upper frequency cut-off due to masking of the central diffraction lobe by the lenses appears at about 200 kc.

Variations of the invention within the scope of the claims will be apparent to those skilled in the art. For example, the term "light" as used herein need not necessarily be limited to visible electromagnetic radiation. The reflecting mirrors can be individual units supported by means other than lens surfaces. In an alternative embodiment, the pellicle can be made rigid and one of the mirrors can be translatable responsively to sonic energy. Indeed, the principle of the invention is not altered by employing any of a large number of variations on the interferometric structure. For example, the mirrors can be placed as in a conventional Michelson interferometer if desired.

Since certain changes may be made in the above apparatus and method without departing from the scope of the invention herein involved it is intended that all matter contained in the above description or shown in the accompanying drawing shall be interpreted in an illustrative and not in a limiting sense.

What is claimed is:
1. A microphone comprising, in combination;
    a source of light;
    an interferometer for providing a circular interference pattern from said light, and including a pair of spaced-apart, parallel plane mirrors, and a planar semi-transmissive, semi-reflective pellicle mounted between and substantially parallel to said mirrors for movement responsively to sonic energy for varying the intensity of the central fringe of said interference pattern; and
    means subtending substantially only said central fringe for detecting variations in said intensity and for translating said variations into electrical signals.
2. A microphone as defined in claim 1 including first means for imaging said source through said pellicle onto one of said mirrors, and second means for imaging the other of said mirrors onto said detecting means.

3. A microphone as defined in claim 1 wherein said first means comprises a first lens system, said source and said one mirror being disposed at the conjugate foci of said first lens system, and said second means comprises a second lens system, said other mirror and detector being disposed at the conjugate foci of said second lens system.

4. A microphone as defined in claim 1 wherein said detecting means is dimensioned to be not more than the width of the image of one fringe;

said interference pattern provided by said second means.

5. A microphone as defined in claim 3 including first hollow, opaque container means supporting internally thereof said source and said first lens system;

second hollow, opaque container means supporting internally thereof said detecting means and said second lens system;

and means supporting both said container means and said pellicle with said lens systems coaxial and spaced apart and with said pellicle in the space between said lens systems open to ambient atmosphere so that said pellicle can move responsive to said sonic energy.

6. A microphone as defined in claim 5 wherein each of said lens system has a planar surface immediately facing said pellicle and said mirrors are mounted on respective ones of said planar surfaces.

References Cited

UNITED STATES PATENTS

| | | | |
|---|---|---|---|
| 1,709,762 | 4/1929 | Zworykin | 179—121 |
| 1,901,632 | 4/1933 | Chamberlain | 179—121 |
| 1,913,867 | 6/1933 | Wood | 179—121 |
| 2,518,743 | 8/1950 | Bach | 88—14 |
| 2,612,074 | 9/1952 | Mirau | 88—14 |

KATHLEEN H. CLAFFY, Primary Examiner

ARTHUR A. McGILL, Assistant Examiner

U.S. Cl. X.R.

356—112